US006448981B1

(12) United States Patent
Kaczmarski

(10) Patent No.: US 6,448,981 B1
(45) Date of Patent: Sep. 10, 2002

(54) INTERMEDIATE USER-INTERFACE DEFINITION METHOD AND SYSTEM

(75) Inventor: Michael Allen Kaczmarski, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/987,589

(22) Filed: Dec. 9, 1997

(51) Int. Cl.[7] ............................................... G06K 15/00
(52) U.S. Cl. ...................................... 345/763; 345/826
(58) Field of Search ................................. 345/335, 333, 345/334, 331, 332, 346, 341–342, 356–357, 339, 744–747, 762, 763, 802, 769, 826, 825, 779, 790, 853–855; 707/10; 709/230–231

(56) References Cited

U.S. PATENT DOCUMENTS

| | | | |
|---|---|---|---|
| 4,930,071 A | | 5/1990 | Tou et al. |
| 5,201,046 A | | 4/1993 | Goldberg et al. |
| 5,287,447 A | * | 2/1994 | Miller et al. ................. 345/339 |
| 5,347,629 A | | 9/1994 | Barrett et al. |
| 5,404,441 A | | 4/1995 | Satoyama |
| 5,457,797 A | | 10/1995 | Butterworth et al. |
| 5,495,567 A | | 2/1996 | Iizawa |
| 5,499,371 A | | 3/1996 | Henninger et al. |
| 5,504,885 A | | 4/1996 | Alashqur |
| 5,544,355 A | | 8/1996 | Chaudhuri et al. |
| 5,546,455 A | | 8/1996 | Joyce et al. |
| 5,555,365 A | | 9/1996 | Selby et al. |
| 5,555,367 A | | 9/1996 | Premerlani et al. |
| 5,623,657 A | | 4/1997 | Conner et al. |
| 5,627,979 A | | 5/1997 | Chang et al. |
| 5,642,511 A | | 6/1997 | Chow et al. |
| 5,870,088 A | * | 2/1999 | Washington et al. ......... 345/326 |
| 5,936,624 A | * | 8/1999 | Lisle et al. ................... 345/348 |
| 5,980,096 A | * | 11/1999 | Thalhammer-Reyero ...... 364/578 |
| 6,003,037 A | * | 12/1999 | Kassabgi et al. ............. 707/103 |
| 6,025,836 A | * | 2/2000 | McBride ....................... 345/326 |
| 6,097,386 A | * | 8/2000 | Bardon et al. ................ 345/333 |
| 6,104,394 A | * | 8/2000 | Lisle et al. ................... 345/339 |

FOREIGN PATENT DOCUMENTS

WO    WO 97/15017    4/1997

OTHER PUBLICATIONS

Author Unknown, "Architecture for Platform and Presentation Independent User Interface for Applications", *IBM Technical Disclosure Bulletin*, vol. 38 No. 01, p. 297–302 (1995).

Author Unknown, "Object Model for a Graphic Network Install Interface", *IBM Technical Disclosure Bulletin*, vol. 38 No. 10, p. 545–547 (1995).

Author Unknown, "Architecture for a Graphic Network Topology Interface", vol. 38 No. 10, p. 517–519 (1995).

Author Unknown, "Input/Output Event Analysis", *IBM Technical Disclosure Bulletin*, vol. 40 No. 07, p. 117–128 (1997).

* cited by examiner

*Primary Examiner*—Steven Sax
(74) *Attorney, Agent, or Firm*—Altera Law Group, LLC

(57) ABSTRACT

A user-interface system and method that includes object-oriented user-interface definitions. User-interface definitions for objects of an application program are created using an interface definition language. An application programming interface provides access to the user-interface definitions. For each user-interface request, the application programming interface is used to obtain the user-interface definition for the referenced object. Responsive to the user-interface definition of the object, user-interface data is dynamically generated by an interface driver. By separating user-interface definitions from the interface driver, modifications to an application program and the corresponding user-interface definitions do not require enhancements to the interface driver.

50 Claims, 7 Drawing Sheets

INTERMEDIATE USER-INTERFACE DEFINITION METHOD AND SYSTEM

FIELD OF THE INVENTION

The present invention generally relates to user-interface systems, and more particularly, to a user-interface system that utilizes intermediate user-interface definitions that, for an application program, classify objects and operations related to the objects so that user-interface data can be generated responsive to the interface definitions.

BACKGROUND OF THE INVENTION

Graphical user-interface (GUI) systems are very popular for user interaction with application programs. However, the development of a GUI for an application program may require significant resources. Furthermore, as the base functionality of the underlying application program changes over time, additional resources are required for maintenance of the GUI. If the GUI is implemented on different client platforms for remote administration of the application program, the effort involved is complicated by the need to maintain multiple code bases that support the GUI for each platform.

A client GUI program often provides some of the same intelligence of the server application program in terms of validation of input data and authorization of operations for selected users. When application functionality and/or operations change, the GUI must also change so that the new functions are available to the user. The continual process of keeping the GUI up-to-date with respect to the server application program may resource intensive, especially where multiple versions and/or styles of a GUI are supported. In addition, special coding is often required to allow a client GUI to interact with different versions of the server application program so that the differences in levels of functionality are available to the user in environments where the single GUI is used to communicate with more than one instance of the server application program.

SUMMARY OF THE INVENTION

The present invention is directed to user-interface methods and arrangements for use in controlling computer based application programs. In a first aspect of the invention, a computer-based user-interface method for operation of a computer application program is provided. The method comprises the steps of: classifying objects of the application program with user-interface object definitions, the objects including operation objects and data objects; receiving a request that references an object; reading user-interface object definitions of the object; generating user-interface data in response to retrieved user-interface definitions; and submitting a command to the application program in response to a request that references an operation object.

A user-interface apparatus is another aspect of the invention. The apparatus comprises: means for classifying objects of the application program with user-interface object definitions, the objects including operation objects and data objects; means for receiving a request that references an object; reading user-interface objects definitions of the object; means for generating user-interface data in response to retrieved user-interface definitions; and means for submitting a command to the application program in response to a request that references an operation object.

In another aspect, the invention provides a user-interface method for an application program hosted by a data processing system. The method comprises the steps of: defining hierarchical classes of data elements of the application program with interface class definitions, predetermined ones of the classes referencing instances of data elements; defining groups of classes with interface group definitions; defining operations with operation definitions, wherein selected operations are associated with selected classes and instances; in response to a user-interface request, performing steps (a)–(d); (a)reading a class definition and an associated operation definition for a request that references a class; (b)reading a group definition for a request that references a group; (c) reading an operation definition for a request that references an operation; and (d)generating user-interface data responsive to data from the reading steps.

A user-interface apparatus is provided in yet another aspect of the invention. The apparatus comprises: means for defining hierarchical classes of data elements of the application program with interface class definitions, predetermined ones of the classes referencing instances of data elements; means for defining groups of classes with interface group definitions; means for defining operations with operation definitions, wherein selected operations are associated with selected classes and instances; means for, in response to a user-interface request, reading a class definition and an associated operation definition for a request that references a class; means for, in response to a user-interface request, reading a group definition for a request that references a group; means for, in response to a user-interface request, reading an operation definition for a request that references an operation; and means for, in response to a user-interface request, generating user-interface data responsive to data from the means for reading.

A user-interface system for use with an application program and a client user-interface program is another aspect of the invention. The system comprises: a user-interface definition file having definitions of groups, classes, operations, and parameters, a group definition including one or more classes, a class definition including one or one or more instances of data elements of the application program, an operation definition including an association with a class, and a parameter definition including an association with an operation; a user-interface definition driver coupled to the user-interface definition file, and configured and arranged to, in response to queries for user-interface definitions, read definitions from the user-interface definition file and provide the definitions as output; and a user-interface driver coupled to the user-interface definition driver and configured and arranged to receive user-interface requests, query the user-interface definition driver for user-interface definitions, and generate user-interface data having a format that is compatible with the client user-interface program and content that is responsive to the user-interface definitions.

The above Summary of the Invention is not intended to describe each disclosed embodiment of the present invention. This is the purpose of the figures and of the Detailed Description that follows.

BRIEF DESCRIPTION OF THE DRAWINGS

Other aspects and advantages of the present invention will become apparent upon reading the following Detailed Description and upon reference to the drawings in which.

Figure 1:
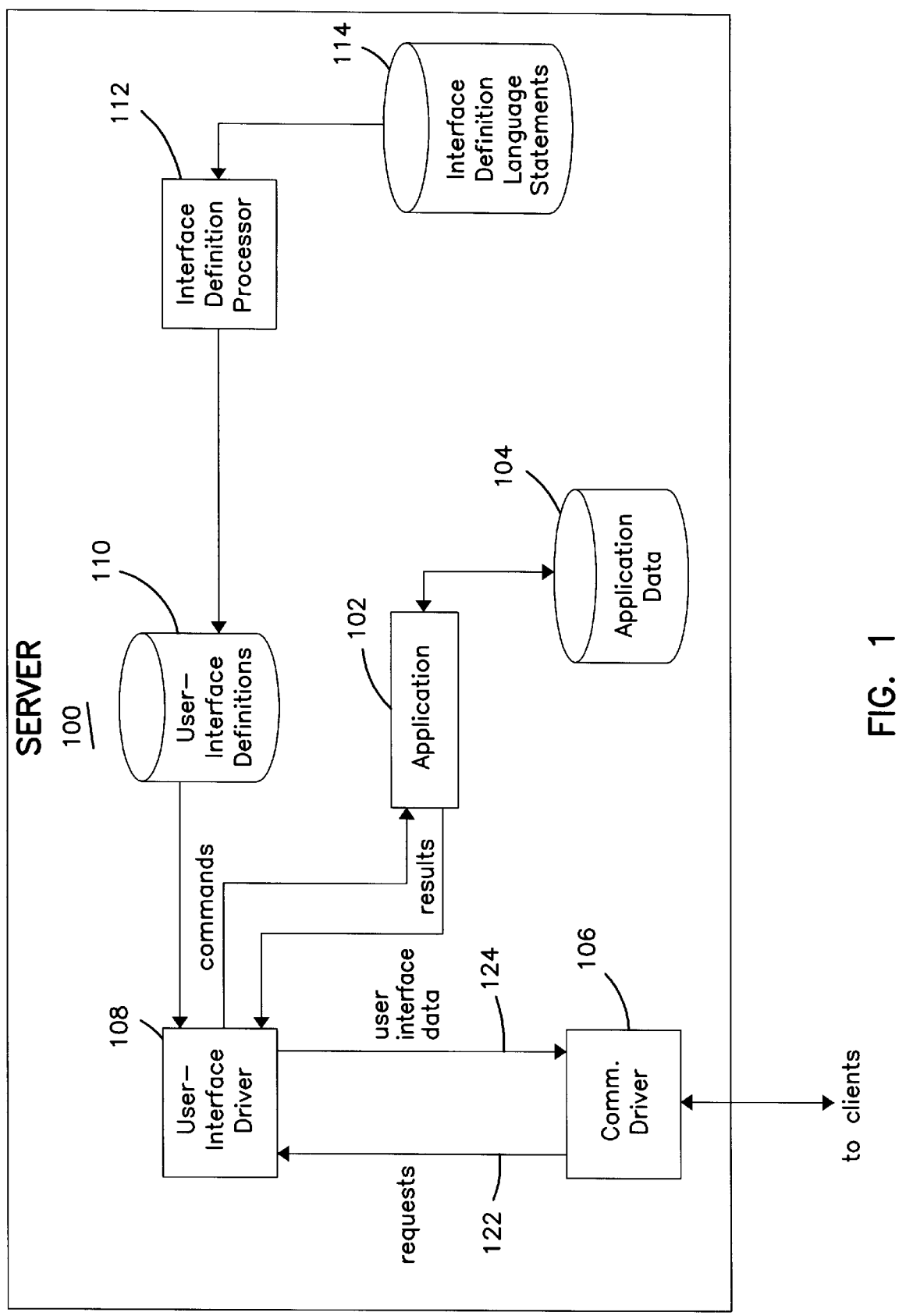
FIG. 1 is a block diagram of a user-interface system that utilizes intermediate user-interface definitions according to an example embodiment of the present invention.

While the invention is amenable to various modifications and alternative forms, specifics thereof are shown by way of example in the drawings and the written description. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of user-interface systems and arrangements for control of computer application programs. The invention has been found to be particularly advantageous in systems that support multiple versions of a client user-interface program. Specifically, the invention has been found to be advantageous with client GUI programs. Statements in a user-interface definition language set forth user-interface definitions for an application program. An application programming interface is used by an user-interface driver to obtain user-interface definitions of the application program, including operation objects. Using the definitions, the user-interface driver dynamically structures user-interface data that is presented to the user for user-interaction with the application program. Once a baseline user-interface driver is coded to use the user-interface definitions, changes to the application program that are defined in the user-interface definitions are automatically incorporated into the user-interface data. Therefore, the resources required to maintain the user-interface driver with respect to the application program are reduced. An appreciation of various aspects of the invention is best gained through a discussion of various application examples operating in such environments.

FIG. 1 is a block diagram of a user-interface system that utilizes intermediate user-interface definitions according to an embodiment of the present invention. The user-interface system operates on server system 100, wherein server system 100 is a conventional data processing system. Server system 100 may be a microcomputer, a minicomputer, or a mainframe computer, depending upon the computation needs of an example application program 102, wherein application program 102 provides access to application data in database 104. Note that real-time data, other than data stored in database 104, may be provided as output from application program 102. Those skilled in the art will recognize that the invention is not limited to database applications.

In the example embodiment of FIG. 1, client application programs (not shown) are remote from the server system 100. Those skilled in the art will recognize that in another embodiment, client programs may execute along with application program 102 on the same system 100. Conventional communications software 106 provides a communications interface between server system 100 and client systems.

The server portion of the user-interface system includes user-interface driver 108 along with user-interface definitions 110. User-interface definitions 110 are generated by interface definition processor 112 whose input is a set of user-interface definition language statements 114. The language used to set forth user-interface definitions 110 is an object based language that supports grouping of data elements of application data 104 along with associated operations. The invention is particularly useful in conjunction with legacy application programs having application data 104 that is not defined in an object based manner. With such legacy application programs, interface definition language statements 114 are used to establish object-type relationships between the data elements, wherein the object-type relationships are then further used to generate a user-interface. The present invention may also be used with application data 104 that is object based in nature. In such an embodiment, interface definition language statements 114 are used to supplement the relationships between the various objects of application data 104 for the purpose of establishing a user-interface.

Interface definition processor 112 reads user-interface definition language statements 114 and generates user-interface definitions 110. User-interface definitions 110 are readable by user-interface driver 108 for driving the user-interface. User-interface driver 108 receives user-interface requests from communications driver 106 as illustrated by line 122. Responsive to user-interface requests, user-interface driver 108 either reads interface definitions 110 or submits commands to application program 102. If the request indicates a function along with parameter values associated with the function, a command is generated and submitted to application program 102. Otherwise, interface definitions 110 are read to determine the user-interface data to generate. Note that user-interface data is returned to communication driver 106 as indicated by line 124.

The intermediate nature of user-interface definitions 110 may be better understood through study of an example language for generating user-interface definitions 110. In furtherance thereof, an example language is described below.

DELETE ALLOBJECTS

This command is used to clear out all interface driver definitions in the server. It is usually placed at the beginning of the macro that is used to load the interface driver so that a "clean slate" is established for loading the interface definitions.

Syntax

DDELete ALLObjects

DAUDIT

This command is used to check all interface driver definitions in the server. It checks for referential integrity between the interface driver table and helps to ensure that the definitions will properly expand to represent a traversable navigation tree through administrative constructs. This command should be executed whenever administrative entries have been defined/loaded into the server.

Syntax

DAUDit

DDEFINE GROUP

This command is used to define a new group to the interface driver.

Syntax

DDEFine GROUP [<groupname>]
   Title=<msgnumber>
   [Icon=<iconname>]

Parameters groupname
: specifies the name of the group; if not specified the MAIN group is assumed msgnumber
: the number for the message that describes this group; messages and message numbers for the interface driver are defined in a predetermined file.

iconname
: the name of the icon that is to be displayed with the group

DDEFINE GROUPMEMBER

This command is used to define a group member to the interface driver.

Syntax

DDEFine GROUPMember [<groupname>]
Member=<membername>
Type=Group|Class
[SEQuence=<number>]

Parameters groupname
: specifies the name of the group; if not specified the MAIN group is assumed membername
: the name of the group or class that is to be added to this group; the specified group/class must already be defined in the interface driver Type=Group|Class
: specifies whether the member to be added is another group or a class number
: specifies the sequence, relative to other group member, that this member is to be displayed. Valid numbers are 0–999. If this parameter is not specified, group members are displayed in the order in which they are defined as members.

DDEFINE CLASS

This command is used to define a class to the interface driver.

Syntax

DDEFine Class <classname>
TItle=<msgnunber>
[TAble=<SQLTableName>]
[KEYcolumn=<SQLKEYColumns>]
[ATTRibutecolumns=<columnSpec>]
[PARENTCLasses=<parentClassSpec>]
[PARENTCOlumns=<parentColumnSpec>]
[Where=<whereClause>]
[CONTains=<classList>]
[CLASSIcon=<classIconName>]
[OBJIcon=<objectIconName>]
[SINGLEOBject=No|Yes]
[SINGLEOPeration=No|Yes]
[OPENaction=<open action command>]

Parameters classname
: specifies the name of the class msgnumber
: the number for the message that describes this class; messages for the interface driver are defined in idameng.msg SQLTableName
: the name of the SQL table in which instances of this class are found. This parameter MUST be specified if SINGLEOPERATION=NO (the default) is specified. If OPENaction is specified, this parameter is ignored SQLKeyColunuis
: Specifies one or more columns in the instance table that uniquely identify the names for instances in this class. This parameter MUST be specified if SINGLEOPERATION=NO (the default). If OPENaction is specified this parameter is ignored.

columnSpec
: Specifies a list of column names or numbers (comma separated) that hold the attributes for an object in this class in the SQL table named in SQLTableName. If this parameter is not specified, all columns in the SQL table will be used as object attributes. If OPENaction is specified this parameter is ignored parentClassSpec
: The column specifies the classes that are parent classes to this class and correspond to the columns specified in the parentColumnSpec below. If this parameter is specified, the number of classes specified MUST be equal to the number of parent columns in the parentColumnSpec. This parameter MUST NOT be specified if SINGLEOPERATION=YES is specified. if OPENaction is specified this parameter is ignored.

parentColumnSpec
: The column specifies the column(s) in the SQL instance table that are used to qualify a class instance based on the object name of the parent complex class (only used by classes that reside in complex classes). This parameter MUST NOT be specified if SINGLEOPERATION=YES is specified. If OPENaction is specified this parameter is ignored.

whereClause
: Specifies the subset of the table whose rows make up the instances in the class. If all rows in an SQL table do not represent class instances, the where clause can be specified to select the rows that DO represent class instances. This parameter MUST NOT be specified if SINGLEOPERATION=YES is specified. This parameter is ignored if OPENaction is specified.

classList
: If the class being defined is a complex class, this parameter lists the names of the classes that are contained in instances of this class. The specified classes must already exist in the interface driver. The class names are specified, comma separated, in the order in which they should be displayed. This parameter MUST NOT be specified if SINGLEOPERATION=YES is specified. This parameter is ignored if OPENaction is specified.

classIconName
: the name of the icon that is to be displayed with the class.

objectIconName
: the name of the icon that is to be displayed with instances (objects) in the class.

SINGLEOBject
: If set to YES, this specifies that the class is guaranteed to always contain a single object. When a class is specified in this fashion, the interface immediately displays the attributes for the single object when the class is selected, since displaying a list of objects with one object being the only choice is not necessary or even intuitive to the user.

SINGLEOPeration

If set to YES, this specifies that the class consists of an operation ONLY and does not necessarily contain any objects. This parameter is used to create "pseudo-classes" that contain operations that do not easily fit under objects in other classes. When SINGLEOPERATION=YES is specified, SINGLEOBJECT=YES MUST also be specified. It is not necessary to specify an SQL table name, key column, attribute columns, parent columns, or class contents when SINGLEOPERATION=YES is specified. The default for this parameter if not specified is No.

OPENaction

This parameter can be used where necessary to specify a command that should be issued when the class is "opened". If an open action is specified, it is assumed that the command will be issued against the server and that the output will be displayed to the user. Because of this, the class table, key column, parent classes, parent columns attribute columns and single object/single operation columns are not used when an open action is specified. The open action, then, can be used to represent server classes that are NOT mapped to SQL tables. Class-type operations can still be specified for these classes, but object-operations have no meaning because there is no mechanism to map instances of the class to actual objects. The default for this parameter if not specified is that no open action command will be executed and the results displayed when the class is "opened" by the user-interface.

DDEFINE OPERATION

This command is used to define an operation that can be performed on a class or class instances (objects).

Syntax

DDEFine OPeration <classname> <operationName>
TItle=<msgnunber>
[SEQuence=<seqNumber>]
[Type=OBjectop|CLassop|COnstructor1
[AUTHority=
General|SYstem|STorage|Policy|ANalyst|Operator]
[Icon=<iconname>]

Parameters classname
specifies the name of the class to which the operation applies.

operationName
specifies the name of the operation.

msgnumber
the number for the message that describes this operation; messages and associated message numbers for the interface driver are defined in a predetermined file.

Type
specifies whether this operation applies to Objects in the class, the Class itself, or if it is a Constructor used to define new instances in the class. The default value if not specified is Object.

iconname
the name of the icon that is to be displayed with the operation.

DDEFINE PARAMETER

This command is used to define an operation that can be performed on a class or class instances (objects).

Syntax

DDEFine PARAMeter|PARM <classname> <operationName>
Name=<parmName>
Type=Literal|Input|Password|Sellist|Multisellist|Radio
[TItle=<titleMsgNo>]
[Length=<inputLength>]
[Value=<valueSpec>]
[Default=<defaultSpe>]
[FORMat=Keyword|Positional]
[SEQuence=<seqNumber>]

Parameters classname
specifies the name of the class to which the operation parameter applies.

operationname
specifies the name of the operation to which the parameter applies.

parmname
parameter name

Type
Specifies the type of parameter in terms of how it is to be displayed. Valid values are:

Literal
The parameter as defined cannot be changed by the user. It must be used, however, to construct the server command for the operation. Literal parameters are typically hidden from the user.

Input
data for the parameter value is to be typed in by the user; when an Input parameter is specified, the LENGTH parameter must be specified as described below Password
is the same as defined for Input above, but the characters entered are not displayed back to the user in the form. The PASSWORD field for the register node operation, for example should be specified as PASSWORD type so the characters entered are not displayed to the user.

Sellist
the value for the parameter is to be selected by the user from a loaded selection list that contains all valid values for the parameter; the Value and Default parameters are used to load the selection list, as specified below.

Multisellist
the value(s) for the parameter is/are to be selected by the user from a loaded selection list that contains all valid values for the parameter; the Value and Default parameters are used to load the selection list, as specified below. This parameter is used when more than one item can be selected from the list. The translated command will specify each of the selections separated by commas.

Radio
the value for the parameter is to be selected by the user from defined radio button selections; the Value and Default parameters are used to load the selection list, as specified below.

titleMsgNo
the number for the message that describes this parameter; messages and associated message numbers for the interface driver are defined in a predetermined message file. If the title message number is NOT specified, the parameter NAME will be displayed for the parameter in any input dialog that is generated by the user-interface.

Length
used ONLY when Type=Input or Type=Password is specified, this value specifies the maximum length for an input field Value
used for Type=Sellist, Multisellist and Type=Radio specification, this field contains information that is used to obtain all valid values for the parameter; The Value specification can have 2 forms:
1. specific enumeration of the legal values for a field, separated by commas and enclosed in parentheses e.g. "(YES,NO)."
2. as an SQL statement that can be executed to obtain a list of all possible values from the server database; e.g., "SELECT DOMAIN NAME FROM ADSM.DOMAINS" to load the selection list for the DOMAIN parameter in the REGISTER NODE operation.
If "preserve( . . . )" is specified outside the string, then the character case-sensitivity of the specified string is preserved for the value specified, otherwise the string is upper-cased before it is stored in the interface driver.

Default
specifies the default value that is to be first displayed for a parameter; valid for Type=Sellist, Multisellist and Type=Radio, and Type=Input. The Default specification can have 2 forms:
1. A literal value.
2. An SQL statement that can be used to obtain the default from the server database "SELECT DOMAIN NAME FROM ADSM.NODES WHERE NODE NAME='$OBJECTNAME'" to obtain the existing policy domain for a node in the UPDATE NODE operation.
If "preserve( . . . )" is specified outside the string, then the character case-sensitivity of the specified string is preserved for the value specified, otherwise the string is upper-cased before it is stored in the interface driver.

Format
specifies whether the parameter is positional or keyword when the server command is constructed; the default is Keyword unless the parameter type is Literal, in which case the default will be positional
a Keyword parameter contains an equals (=) sign—
DOMAIN=STANDARD
a Positional parameter is specified without an equals (=) sign seqnumber
specifies the order in which parameters are to be displayed, and the order in which they are to be used to construct the server command for the operation; the default order, if the SEQUENCE parameter is not specified, is the order in which parameters are defined to the server.

SQL specification symbols
When the SQL SELECT statement is used in the DDEFINE CLASS and DDEFINE PARAMETER commands, special symbols may be used to represent the name of the current object, or that of its parents:

the $OBJECTNAME symbol represents the current object's name.
the $OBJECTNAMEn symbol represents the current object's name when multiple key columns are needed to uniquely identify an object instance; the multiple key specification is a list of key columns separated by commas. The '$OBJECTNAME1 . . . $OBJECTNAMEn' symbols represent the first through nth key columns in the string. The $PARENTn symbol is used to represent the name of parent objects, for objects that reside in complex classes; $PARENT1 is the oldest grandparent, and $PARENTn is the immediate parent of the object. In the UPDATE operation for the MGMTCLASS class, for example, the following SQL statement is specified as the DEFAULT value for the DESCRIPTION parameter to preload the description with the current description for the management class in the database:
SELECT DESCRIPTION FROM MGMT-CLASSES WHERE DOMAIN_NAME= '$PARENT1' AND SET_NAME= '$PARENT2' AND CLASS_NAME= '$OBJECTNAME'

The name of the current management class object is substituted for the $OBJECTNAME symbol, the name of the current POLICY DOMAIN parent object is substituted for the $PARENT1 symbol, and the name of the current POLICY SET object is substituted for the $PARENT2 symbol. The policy domain is the oldest grand parent to the management class and the policy set is the immediate parent.

Figure 2:
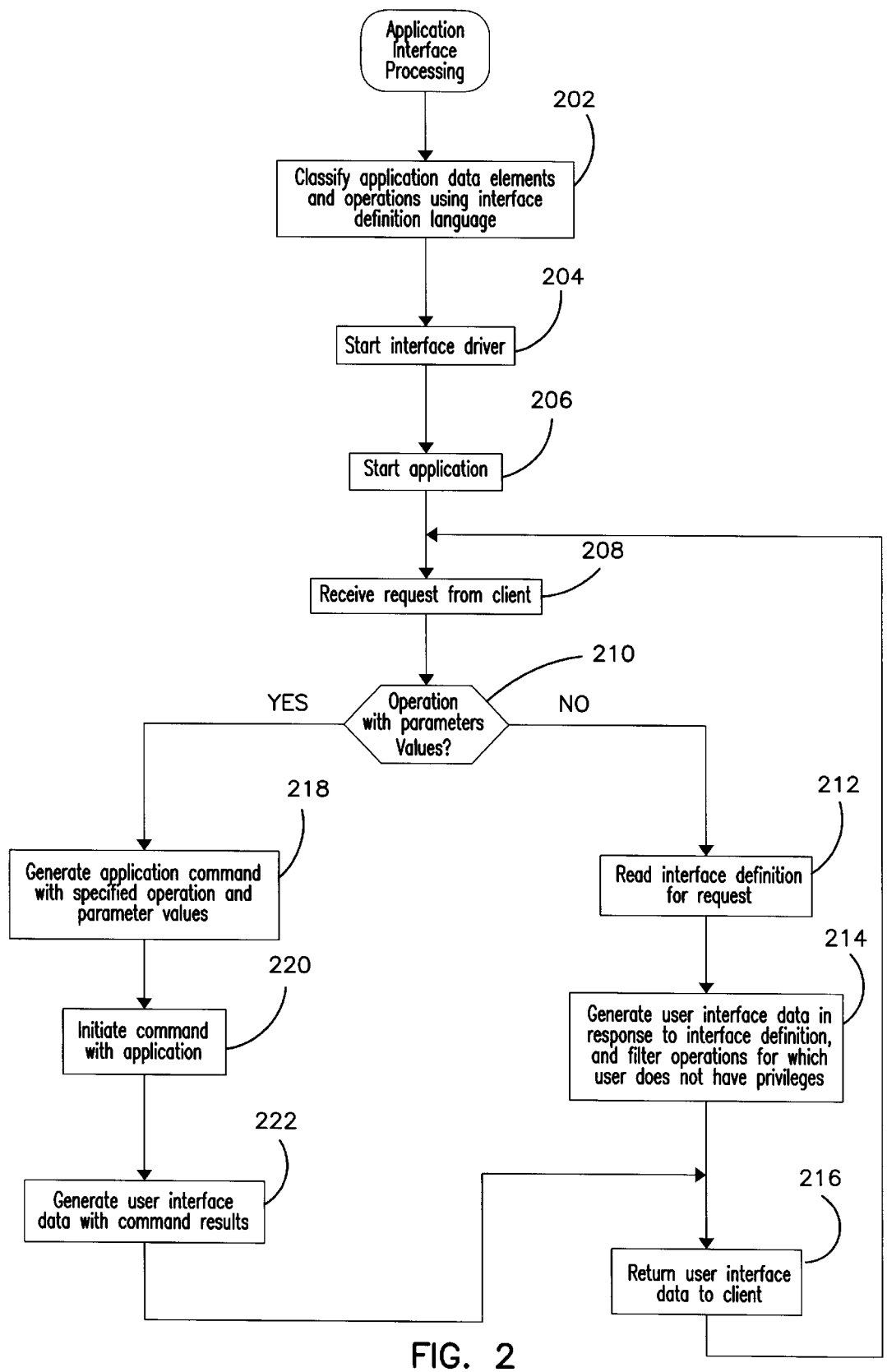
FIG. 2 is a flowchart of a method for utilizing intermediate user-interface definitions according to the embodiment of FIG. 1.

FIG. 2 is a flowchart of an example method that uses intermediate user-interface definitions for generating user-interface data according to the embodiment of FIG. 1. At block 202, data elements and operations of application program 102 are classified using a user-interface definition language. The classified data elements and operations result in intermediate user-interface definitions 110 that are available for user-interface driver 108. User-interface driver 108 and application program 102 are started at blocks 204 and 206, respectively. At block 208, a request is received from a client user-interface program.

Continuing at block 210, unless the request is an operation that includes parameter values, control is directed to processing block 212. Responsive to the request, a user-interface definition is read at block 212. Then, according to the interface definition, at block 214, user-interface driver 108 generates user-interface data. Note that if the user-interface definition is that of an operation, an associated authority level is used to control whether the user is presented with the opportunity to initiate the operation. If the user that submitted the request does not possess the required level of authority, the operation is not included in the user-interface data. At processing block 216, the interface data is then returned to a client interface program, for example and control is returned to block 208.

Returning now to block 210, if a request includes an operation having parameter values specified, control is directed to processing block 218. From information contained in the request, user-interface driver 108 generates a command along with specified parameter values at block 218. At block 220, the command is initiated with application program 102. Once the application program returns results in response to processing the command, interface driver 108 generates user-interface data, as shown by block 222. The user-interface data is then returned to a client user-interface program.

Figure 3:
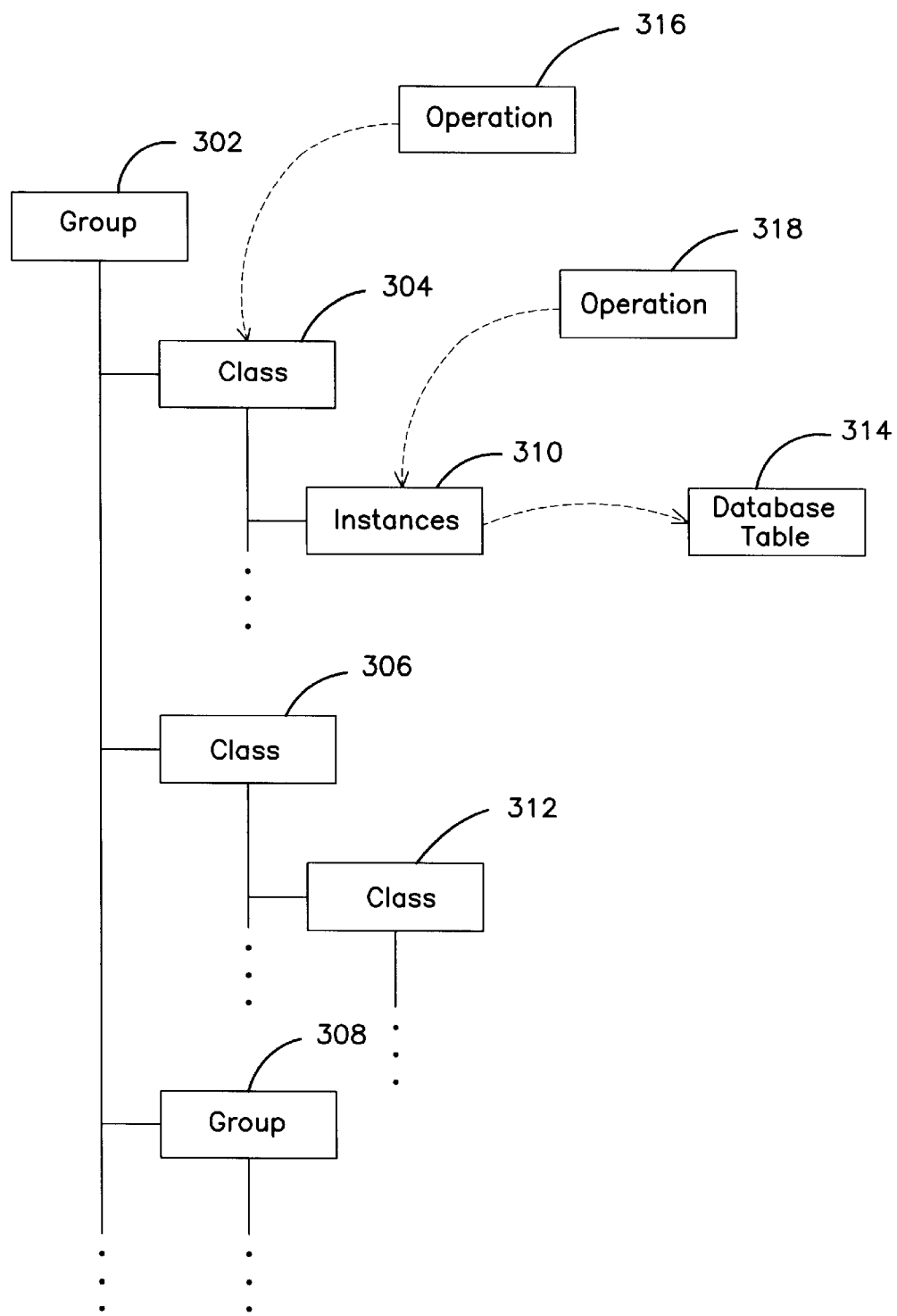
FIG. 3 is a block diagram that illustrates that illustrates the hierarchical relationship between intermediate user-interface definitions of an application program.

FIG. 3 is a block diagram that illustrates the hierarchical relationship between user-interface definition constructs as provided by the example interface definition language described above. At the highest level of the hierarchy is group 302. Group 302 includes a plurality of classes 304 and 306 along with a definition of a group 308, for example. A class may be defined in terms of object instances that comprise the class, as indicated by instances 310 of class 304, for example. Note that a class instance may include other classes as well. For example, class 306 is defined as having class 312.

The user-interface definition language provides for mapping object instances to data elements of an application program. For example, instances 310 are mapped to database table 314. This mapping allows user-interface driver 108 to generate commands for specific data from application program 102 and to show attributes for specific object instances.

The example interface definition language described above also permits functions provided by application program 102 to be mapped to classes and object instances defined in the user-interface definitions 110. For example, operation 316 is mapped to class 304, and operation 318 is mapped to instances 310.

Figure 4:
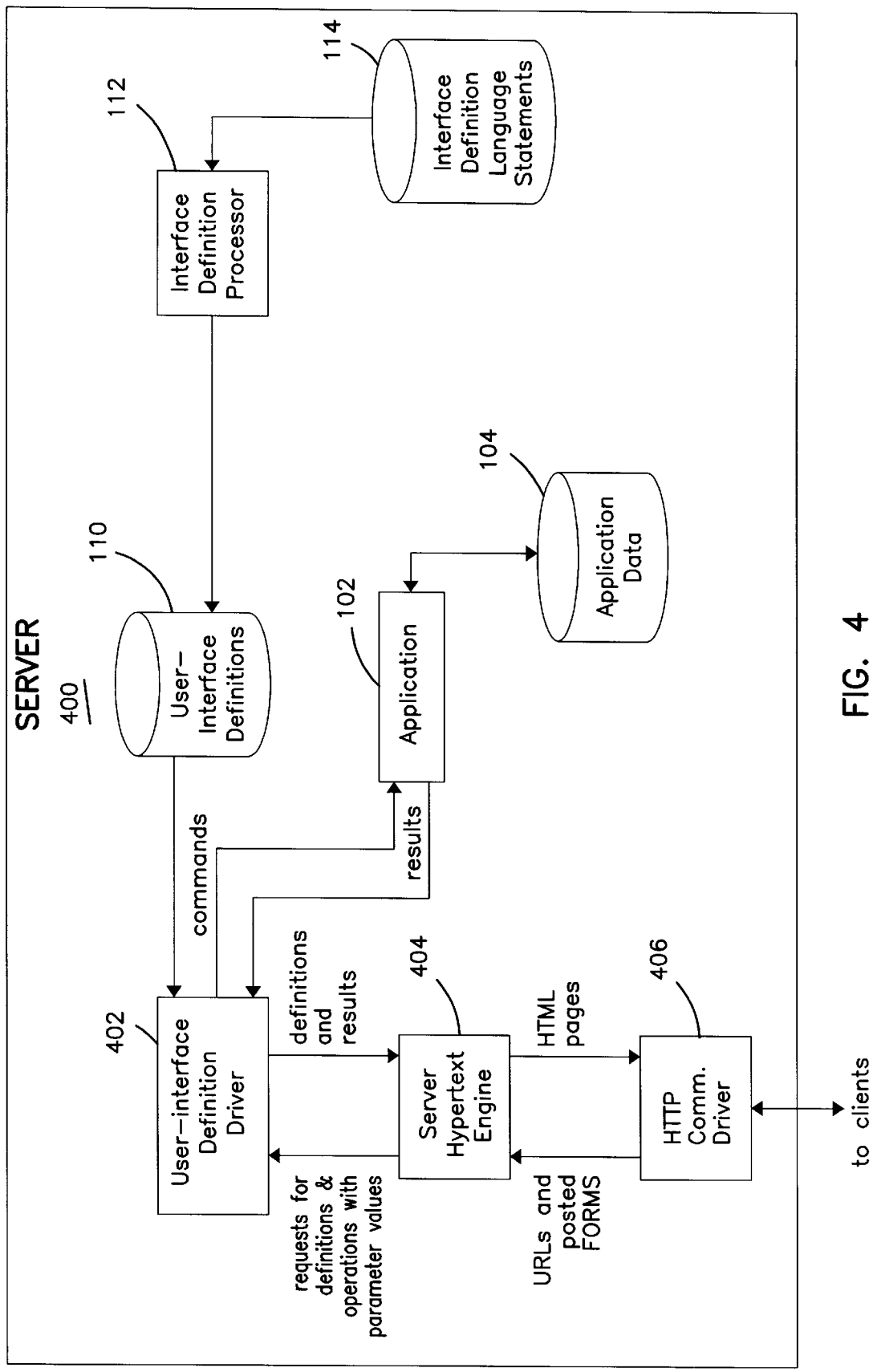
FIG. 4 is a block diagram of an example user-interface system that utilizes intermediate user-interface definitions according to another embodiment of the present invention.

FIG. 4 is a block diagram of a user-interface system that utilizes intermediate user-interface definitions according to another embodiment of the invention. The user-interface system along with the application program 102 are hosted by server system 400, for example. The embodiment of FIG. 4 differs from the embodiment of FIG. 1 in that a user-interface definition driver 402 provides an application programming interface for obtaining intermediate user-interface definitions 110. The application programming interface provided by user-interface definition driver 402 may be utilized by various types of user-interface engines, for example server hypertext engine 404. Other types of user-interface engines include, for example, those compatible with X-Windows, Windows 95, Windows NT, Presentation Manager and others known to those skilled in the art.

The server user-interface engine must be compatible with a client interface program from which requests are received. For example, server hypertext engine 404 must be compatible with selected web browsers. However, because data elements and operations of application program 102 are defined as intermediate user-interface definitions 110, server hypertext engine 404 need not be changed when modifications are made to the data elements and functions provided by application program 102. Server hypertext engine 404 is programmed to generate user-interface data according to user-interface definitions of groups, classes, object instances, and operations as set forth in user-interface definitions 110.

Operationally, server hypertext engine 404 receives uniform resource locators (URLs) from hypertext transport protocol (HTTP) communications driver 406. In response, requests for user-interface definitions are made to user-interface definition driver 402. User-interface definition driver 402 reads user-interface definitions 110 and returns the definitions to server hypertext engine 404. Server hypertext engine 404 generates hypertext markup language (HTML) pages whose content is driven by the intermediate user-interface definitions returned from user-interface definition driver 402 and whose format is dictated by the client user-interface program, e.g., HTML. The HTML pages are then provided to HTTP communications driver 406 for delivery to a web browser.

Note that an HTML form is generated by server hypertext engine 404 to solicit values for parameters when an operation request is sent from a web browser. The content of the form is driven by an operation definition set forth in user-interface definitions 110. An HTML form with specified values is sent from a web browser to server hypertext engine 404 to initiate the operation with application 102. Server hypertext engine 404 forwards the operation and parameter values to user-interface definition driver 402, and user-interface definition driver 402 submits a command to application program 102 to initiate the operation.

An example application programming interface used by server hypertext engine 404 and provided by user-interface definition driver 402 is described in the following data structure specifications and listing of functions provided by user-interface definition driver 402.

```
/****************************************************************/
/* Data Types Exported by the Interface Driver */
/****************************************************************/
/* Group Member Types */
typedef enum    { idMemberGroup, idMemberClass } idMemberType;
/* Class type */
typedef enum    { idClassComplex,       /* complex class (contains other */
                                        /* classes) */
                  idClassSimple         /* simple class */
                } idClassType;
/* Operation Authority type */
typedef enum    { idAuthAny,
                  idAuthSystem,
                  idAuthStorage,
                  idAuthPolicy,
                  idAuthAnalyst,
                  idAuthOperator } idAuthType;
/* operation type for class operations */
typedef enum    { idOpTypeClass,        /* Class Operator*/
                  idOpTypeObject,       /* Class Instance Operator*/
                  idOpTypeConstructor   /* Class Instance Constructor*/
                } idClassOpType;
/* parameter type for class operations */
typedef enum    { idParmTypeLiteral,
                  idParmTypeInput,
                  idParmTypePassword,
                  idParmTypeSelectionList,
```

-continued

```
                idParmTypeMultiSelectionList,
                idParmTypeRadioButton,
                idParmTypeOnOff } idParmType;
/* parameter format type for class operations */
typedef enum   { idFormatKeyword,
                idFormatPositional } idParmFormatType;
/*********************************************************************/
/* Data Structures Exported by the Interface Driver*/
/*********************************************************************/
/*
* group structure used to return group attributes from a query
*/
typedef struct _idGroup
{
    char                groupName [ID_MAX_NAME+1];
    int32               groupTitle;
    char                groupIcon [ID_MAX_ICON_NAME+1]
} idGroup;
/*
* group member structure used to return group member attributes from
* a query
*/
typedef struct _idGroupMember
{
    char                memberName [ID_MAX_NAME+1];
    int32               memberTitle;
    idMemberType        memberType;
    char                memberIcon [ID_MAX_ICON_NAME+1];
    struct _idGroupMember  *next;
} idGroupMember;
/*
* Class Structure used to return attributes from a class query
*/
typedef struct _idclass
{
    char           className [ID_MAX_NAME+1];        /* class name*/
    idClassType    classType;                         /* class type*/
    int32          classTitle;                        /* title for class*/
    char           classIcon [ID_MAX_ICON_NAME+1];    /* class icon name*/
    char           objectIcon [ID_MAX_ICON_NAME+1];   /* icon name for*/
                                                      /* objects in class*/
    Boolean        singleObject;/* is there only one object in class?*/
    Boolean        singleOp;    /* is there only one operation for the */
                                /* class (e.g. QUERY) */
    char           openAction [ID_MAX_OPENACTION+1];
                                /* optional Command that should be*/
                                /* performed when a class is opened*/
    struct _idclass *next;   /* used for lists */
} idClass;
/*
* Operation Structure used to return operations for a class or object
*/
typedef struct _idop
{
    char           opName [ID_MAX_NAME+1];           /*operation name*/
    idClassOpType  opType;                            /*operation type*/
    int32          opTitle;                           /* title for op*/
    idAuthType     opAuth;                            /*op authority*/
    char           opIcon [ID_MAX_ICON_NAME+1];       /*op icon name*/
    struct _idop *next;                               /* used for lists*/
} idOp;
/*
* Operation Structure used to return parameters for the operation
*/
typedef struct _idopparm
{
    char              parmName [ID_MAX_NAME+1];      /* parameter name*/
    int32             parmTitle;                      /* parm title msg*/
    idParmType        parmType;                       /* parameter type*/
    idParmFormatType  parmFormat;                     /* paramter format*/
    int32             parmLength;                     /* input length*/
    char              **parmValue;                    /* list of possible*/
                                                      /* values*/
    char              *parmDefault;                   /* default parm */
                                                      /* value */
    char              buffer [100];                   /* buffer for char */
                                                      /* fields if they */
                                                      /* fit */
    struct _idopparm *next;                           /* used for lists */
```

-continued

```
}   idopParm;
/***********************************************************************/
/* Functions Exported by the Interface Driver */
/***********************************************************************/
/* idGroupQuery returns the attributes of a group, given an input */
/* groupName */
extern int idGroupQuery         ( char              *groupName,
                                  idGroup           *group );
/* idGroupQueryMembers returns the members in a group, given an */
/* groupName */
extern int idGroupQueryMembers  ( char              *groupName,
                                  idGroupMember     **groupList );
/* idClassQuery returns a definition of a class given an input */
/* className */
extern int idClassQuery         ( char              *className,
                                  idClass           *class );
/* idClassQueryObjects returns a list of parent classes and */
/* object instances in a class, given an input className */
extern int idClassQueryObjects  ( char              *className,
                                  char              **parentList,
                                  char              ***parentClassList,
                                  uchar             ***objectNameList );
/* idClassQueryClasses returns a list of subclasses, given */
/* an input className */
extern int idClassQueryClasses  ( char              *className,
                                  idClass           **classList);
/* idClassQueryOps returns a list of operations having an */
/* authority level of adminName and associated with */
/* an input className */
extern int idClassQueryOps      ( char              *adminName,
                                  char              *className,
                                  idOp              **opList );
/* idObjectQueryAttrs returns the attribute of an object */
/* instance along with associated values */
extern int idObjectQueryAttrs   (char               *className,
                                  char              *objectName,
                                  char              **parentList,
                                  uchar             ***descList,
                                  uchar             ***attrList );
/* idOpQueryParms returns a list of parameters associated with */
/* an input operation opName */
extern int idOpQueryParms       ( char              *className,
                                  char              *objectName,
                                  char              *opName,
                                  char              *parentList[ ],
                                  idOpParm          **parmList );
```

Figure 5A:
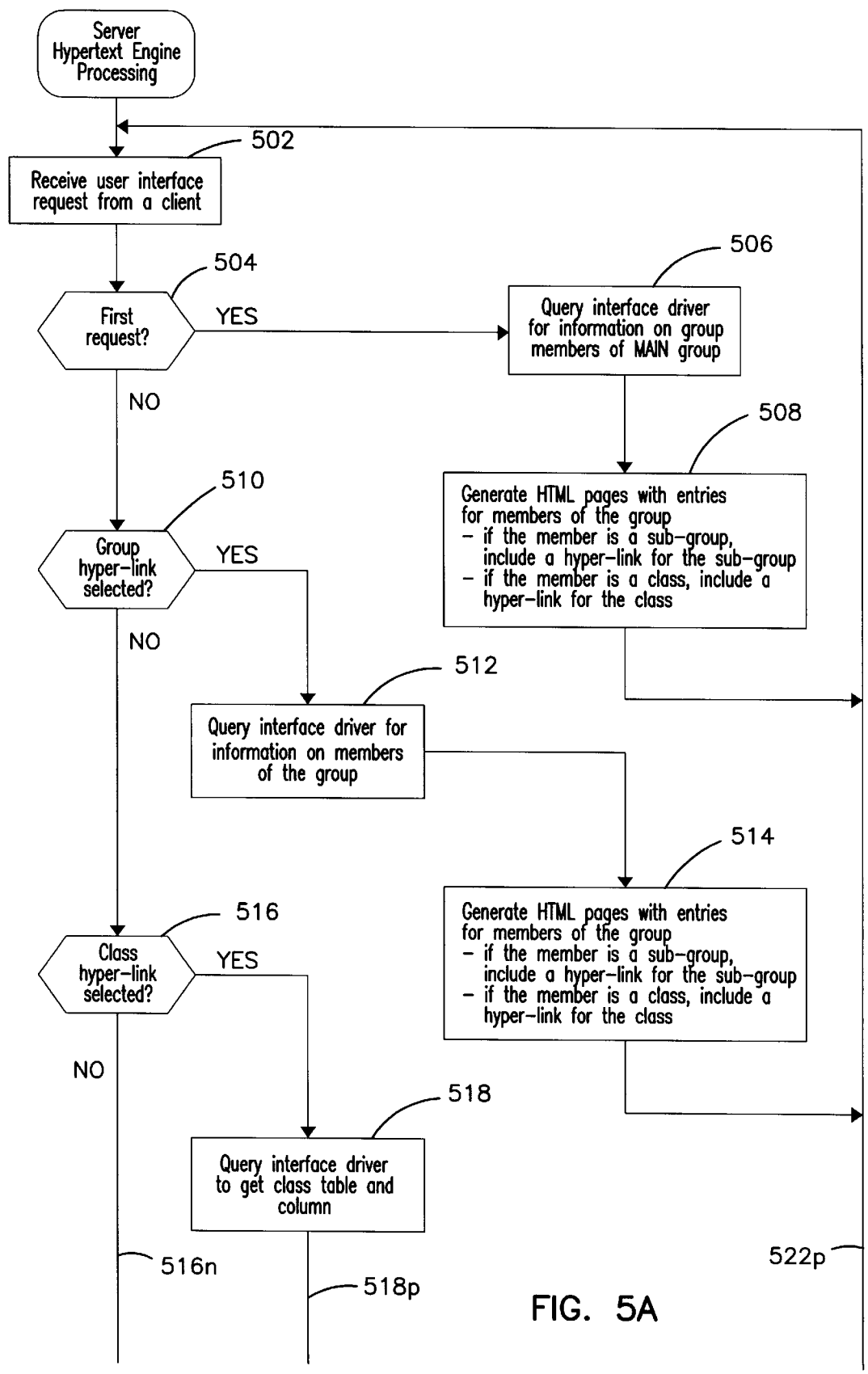
FIGS. 5A and 5B together form a flowchart of a method for utilizing intermediate user-interface definitions according to the embodiment of FIG. 4.
Figure 5B:
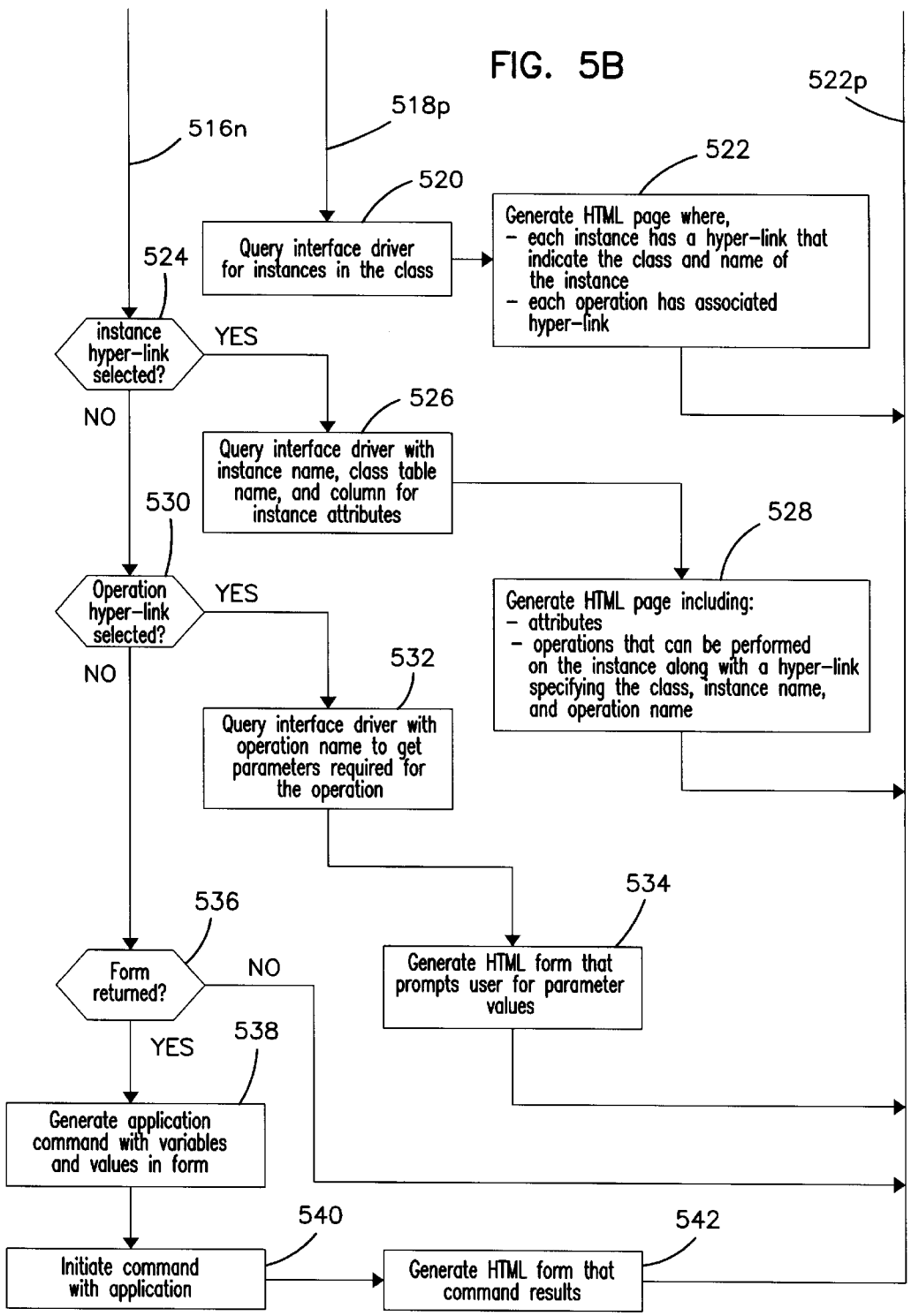

FIGS. 5A and 5B together form a flowchart of the processing performed by server hypertext engine 404. While the processing described in FIGS. 5A and 5B is directed to an HTML style interface, those skilled in the art will recognize that various other graphical user-interfaces could use and benefit from the intermediate user-interface definitions of the present invention.

At processing block 502, server hypertext engine 404 receives a user-interface request from a client user-interface program. If the request is the first user-interface request, processing block 504 directs control to block 506, where server hypertext engine 404 queries user-interface definition driver 402 for information on group members of the predefined main group. User-interface definitions returned from user-interface definition driver 402 to server hypertext engine 404 are used to generate an HTML page at processing block 508. The HTML page includes entries for members of the predefined "main" group, if the member is a subgroup within the main group, a hyperlink is included in the HTML page, and if the member is a class, a hyperlink for the class is included in the HTML page. Processing then returns to processing block 502 to receive another request from a client interface program. Continuing now at block 510, if the user-interface request indicates that a group hyperlink is selected, control is directed to block 512. Server hypertext engine 404 queries user-interface definition driver 402 for user-interface definitions on members of the selected group at processing block 512. At processing block 514, an HTML page is generated as described above for processing block 508. Control is then returned to processing block 502 to receive another user-interface request.

At processing block 516, control is directed to block 518 if the user-interface request indicates selection of a class hyperlink. Server hypertext engine 404 queries user-interface definition driver 402 for user-interface definitions of database table and columns for the class, as indicated by block 518. Control is then directed, via path 518p to processing block 520. At block 520, server hypertext engine 404 queries user-interface definition driver 402 for interface definitions that specify object instances of the class. Continuing at processing block 522, server hypertext engine 404 generates an HTML page where, each instance has a hyperlink that indicates the class and name of the instance, and each operation has an associated hyperlink. Note that if the user-interface definition is of an operation, an associated authority level is used to control whether the user is presented with the opportunity to initiate the operation. If the user that submitted the request does not possess the required level of authority, the operation is not included in the user-interface data. The above described authorization mechanism is applied to all operations. Control is then returned to block 502 via control path 522p.

Block 516 directs control, via control path 516n to block 524 if the user-interface request was not a selection of a class hyperlink. If the user-interface request is a selection of an instance hyperlink, block 524 directs control to block 526, where user-interface definition driver 402 is queried for user-interface definitions related to the selected instance. Using the returned interface definitions, server hypertext engine 404 generates an HTML page that includes attributes and values of the object instance and operations that can be performed on the object instance, along with a hyperlink that specifies the class, object instance name, and operation name. Control is then returned to block 502 via control path 522p.

Block 530 directs control to block 532 if the request indicates selection of a hyperlink for an operation. Server hypertext engine 404 queries user-interface definition driver 402 at block 532 for interface definitions for the operation. Note that interface definitions for an operation include specifications of parameters that are required for submitting the operation to application program 102. Processing continues at block 534 where server hypertext engine 404 generates an HTML form that prompts a user for parameter values. Control is then returned to block 502 via control path 522p.

At block 536, control is directed to block 538 if the user-interface request is an HTML form. In response to a completed HTML form, server hypertext engine 404 submits the operation name along with parameter values to user-interface definition driver 402, where an application command is generated with values taken from the HTML form. Processing continues at block 540 where the command is initiated with application program 102. At processing block 542, command results that are returned from application program 102 via user-interface definition driver 402 are used to generate an HTML page with results of the command. Processing then continues at block 502 as described above.

Figure 6:
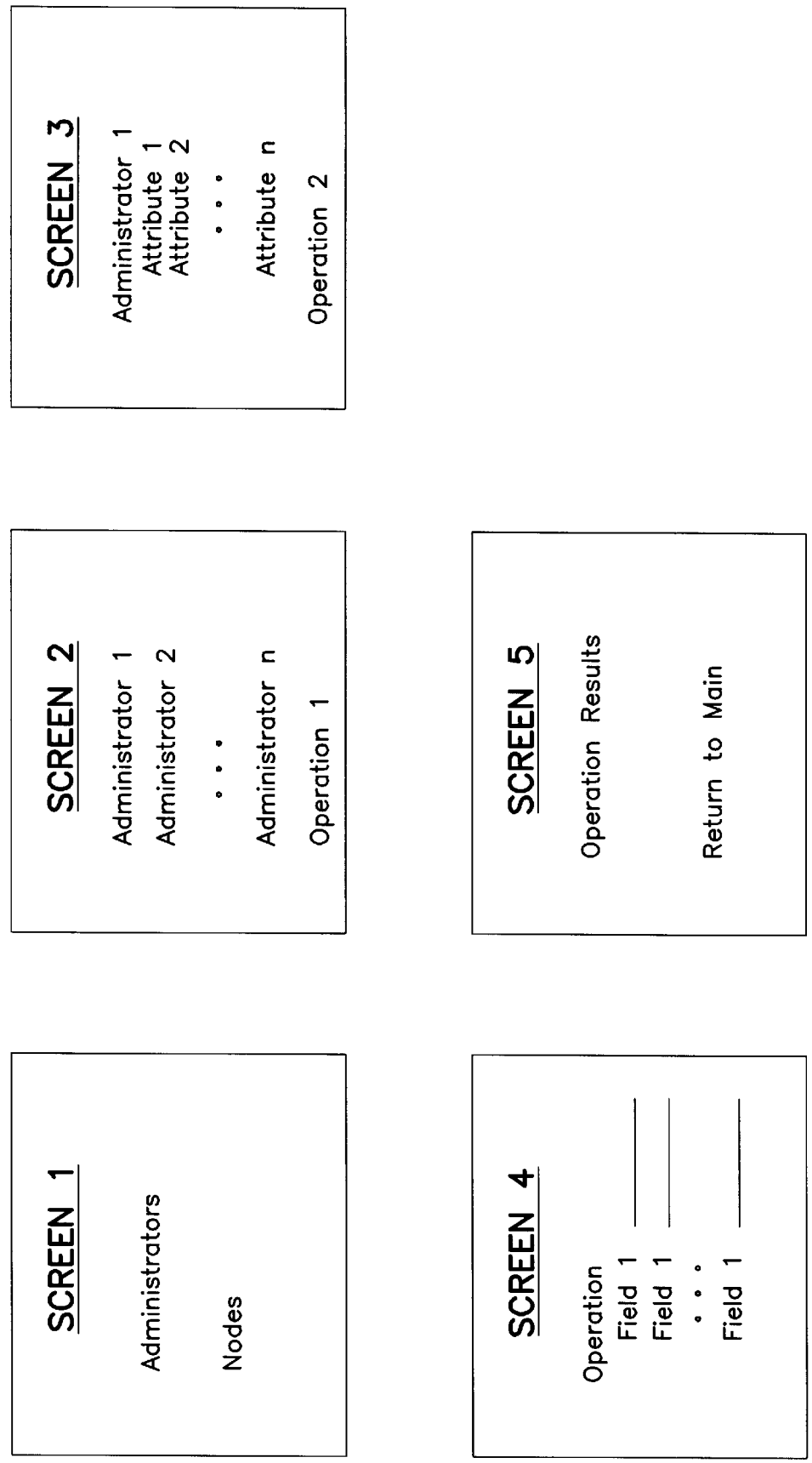
FIG. 6 includes a sequence of screens of example user-interface data generated in accordance with the present invention.

FIG. 6 illustrates an example of a sequence of user-interface screens as generated by server hypertext engine 404. Screen 1 assumes the Main group in the interface definition 110 includes two classes: administrators and nodes. The administrators class contains all object instances of administrators, and the nodes class contains all backup/archive nodes object instances.

Upon initial connection to server 400 from a browser, server hypertext engine 404 queries user-interface definition driver 402 to retrieve interface definitions for the "main" group. Server hypertext engine 404 generates an HTML page with two entries that represent the two classes. These entries contain hyperlinks that can be selected to expand these classes.

If the administrators link is selected, server hypertext engine 404 queries user-interface definition driver 402 for user-interface definition of instances within the administrator class. Server hypertext engine 404 then generates an HTML page having hyperlinked entries representing each administrator. As shown by screen 2, administrators 1–n are listed, along with operation 1 that is associated with the class, administrators. Operation 1 may be "create," for example.

If a link for an administrator instance, for example administrator 1, is selected, server hypertext engine 404 queries user-interface definition driver 402 to obtain user-interface definition of the database table for attribute values for administrator 1. User-interface definition driver 110 then queries the database via application program 102 for the attributes. The returned attributes are then used by server hypertext engine 404 to generate an HTML page that displays the attributes. Screen 3 illustrates the display of administrator 1 along with its associated attributes 1–n. In addition, an example operation 2 is associated with the instance administrator 1 and included as a hyperlink in the HTML page. Example operations for an administrator instance may include update, delete, and grant authority.

When an operation is selected, server hypertext engine 404 queries user-interface definition driver 402 for interface definitions of parameters related to the operation. Server hypertext engine 404 then generates an HTML form that is used to query the user for values for required parameters. Screen 4 illustrates a user-interface screen to be filled in with values for fields 1–n that relate to an operation.

When the form is posted back to server hypertext engine 404, the values in the fields of the form are used to generate a command that is issued to the application program 102. Data that results from processing of the command by application program 102 is formatted in an HTML form and returned to a browser, as illustrated by screen 5.

The above specification, examples and data provide a complete description of the manufacture and use of the composition of the invention. Those skilled in the art will recognize that the arrangements described above are operable on various categories of computer systems and data processing arrangements, and that the described methods operable in such arrangements may be embodied in software, firmware, microcode, ASICs, PGAs, as well as other forms. Software implementations may be distributed in various forms of computer readable media known in the art. Since many embodiments of the invention can be made without departing from the spirit and scope of the invention, the invention resides in the claims hereinafter appended.

What is claimed is:

1. A computer-based user-interface method for operation of a computer application program, comprising:

generating a user-interface request from a user-interface program to retrieve object definitions of an application program;

displaying objects of the application program in response to the user-interface request and associated user-authority, the objects including operation objects and data objects that are manipulated by a user to control the operation of the application program;

receiving a request from the user-interface program that references a defined object manipulated by the user;

reading user-interface definitions of the defined object;

generating user-interface data in response to retrieved user-interface definitions; and submitting a command to the application program in response to the request that references a defined operation object, wherein the results generated by the application program in response to the command are displayed by the user-interface program.

2. The method of claim 1, further comprising:

generating user-interface data to solicit a value for a parameter in response to a request that references a defined operation object;

receiving a request that Includes a value for the parameter;

generating a command with the value for the parameter; and submitting the command with the value for the parameter to the application program.

3. The method of claim 1, further comprising:

storing updated user-interface definitions for objects of the application program;

after storing the updated user-interface definitions, receiving a request that references a defined object of the application program;

retrieving updated user-interface definitions for the defined object;

generating updated user-interface data in response to the updated user-interface definitions; and submitting a command to the application program in response to the updated user-interface definitions.

4. The method of claim 1, wherein the user-interface definitions include definitions of groups, classes, operations, and parameters, a group definition including one or more classes, a class definition including one or more object instances of data objects of the application program, an operation definition including an association with a class, and a parameter definition including an association with an operation.

5. The method of claim 4, wherein an operation definition further includes an association with the one or more object instances of data objects of the application program.

6. The method of claim 4, wherein a group definition includes one or more groups.

7. The method of claim 4, wherein an operation further includes an authority level indicative of users having authorization to initiate the operation, and further comprising the step of omitting from the user-interface data an operation for which a user that submitted a request does not possess a requisite authority level.

8. The method of claim 4, wherein a group definition includes a graphical image.

9. The method of claim 4, wherein a class definition includes a graphical image.

10. The method of claim 4, wherein an operation definition includes a graphical image.

11. The method of claim 4, wherein a group definition includes a first graphical image, a class definition includes a second graphical image, and an operation definition includes a third graphical image.

12. The method of claim 1, further comprising the steps of:

generating user-interface data in response to requests for operation objects and associated user-interface definition data, the user-interface data soliciting for input parameter data; and submitting to the application program the input parameter data along with the commands.

13. A user-interface apparatus for operation of a computer application program, comprising:

means for generating a user-interface request from a user-interface program to retrieve object definitions of an application program;

means for displaying objects of the application program in response to the user-interface request and associated user-authority, the objects including operation objects and data objects that are manipulated by a user to control the operation of the application program;

means for receiving a request from the user-interface program that references a defined object manipulated by the user;

means for reading user-interface definitions of the defined object;

means for generating user-interface data in response to retrieved user-interface definitions; and means for submitting a command to the application program in response to a request that references a defined operation object, wherein the results generated by the application program in response to the command are displayed by the user-interface program.

14. The apparatus of claim 13, further comprising:

means for generating user-interface data to solicit a value for a parameter in response to a request that references a defined operation object;

means for receiving a request that includes a value for the parameter;

means for generating a command with the values for the parameters; and means for submitting the command with the value for the parameter to the computer application program.

15. The apparatus of claim 13, further comprising:

means for storing updated user-interface definitions for the defined objects of the application program;

means for receiving a request that references a defined object of the application program after storing the updated user-interface definitions;

means for retrieving updated user-interface definitions for the defined object after storing the updated user-interface definitions;

means for generating updated user-interface data in response to the updated user-interface definitions after storing the updated user-interface definitions; and means for submitting a command to the application program in response to the updated user-interface definitions after storing the updated user-interface definitions.

16. The apparatus of claim 13, wherein the user-interface definitions include definitions of groups, classes, operations, and parameters, a group definition including one or more classes, a class definition Including one or more object instances of data objects of the application program, an operation definition including an association with a class, and a parameter definition including an association with an operation.

17. The apparatus of claim 16, wherein an operation further includes an authority level indicative of users having authorization to initiate the operation, and further comprising means for omitting from the user-interface data an operation for which a user that submitted a request does not possess a requisite authority level.

18. The apparatus of claim 13, further comprising:

means for generating user-interface data in response to requests for operation objects and associated user-interface definition data, the user-interface data soliciting for input parameter date; and means for submitting to the application program the input parameter data along with the commands.

19. An article of manufacture for a computer-based user-interface, the article of manufacture comprising a computer readable medium having instructions for causing a computer to perform a method comprising:

generating a user-interface request from a user-interface program to retrieve object definitions of an application program;

displaying objects of the application program in response to the user interface request and associated user authority, the objects including operation objects and data objects that are manipulated by a user to control the operation of the application program;

receiving a request from the user interface program that references a defined object manipulated by the user;

reading user-interface definitions of the defined object;
generating user-interface data in response to retrieved user-interface definitions; and
submitting a command to the application program in response to a request that references a defined operation object, wherein the results generated by the application program in response to the command are displayed by the user interface program.

20. The article of claim 19, wherein the computer readable medium further comprises instructions for causing a computer to perform:
generating user-interface data to solicit a value for a parameter in response to a request that references a defined operation object;
receiving a request that includes a value for the parameter;
generating a command with the value for the parameter; and
submitting the command with the value for the parameter to the application program.

21. The article of claim 19, wherein the computer readable medium further comprises instructions for causing a computer to perform:
storing updated user-interface definitions for objects of the application program;
after storing the updated user-interface definitions,
receiving a request that references a defined object of the application program;
retrieving updated user-interface definitions for the defined object;
generating updated user-interface data in response to the updated user-interface definitions; and
submitting a command to the application program in response to the updated user-interface definitions.

22. The article of claim 19, wherein the user-interface definitions Include definitions of groups, classes, operations, and parameters, a group definition including one or more classes, a class definition including one or more object instances of data objects of the application program, an operation definition including an association with a class, and a parameter definition including an association with an operation.

23. The article of claim 22, wherein an operation further includes an authority level indicative of users having authorization to initiate the operation, and the computer readable medium further comprises instructions for causing a computer to perform the step of omitting from the user-interface data an operation for which a user that submitted a request does not possess a requisite authority level.

24. The article of claim 19, wherein the computer readable medium further comprises instructions for causing a computer to perform the steps of:
generating user-interface data in response to requests for operation objects and associated user-interface definition data, the user-interface data soliciting for input parameter data; and
submitting to the application program the input parameter data along with the commands.

25. A user-interface method for an application program hosted by a data processing system, comprising the steps of:
generating a user-interface request from a user-interface program to retrieve definitions of an application program;
defining hierarchical classes of data elements of the application program with user-interface definitions, predetermined ones of the classes referencing object instances of data elements;
defining groups of classes with user-interface group definitions;
defining operations with operation definitions, wherein selected operations are associated with selected classes and object instances;
in response to a user-interface request,
reading a class definition and an associated operation definition for the user-interface request that references a class;
reading a group definition for the user-interface request that references a group;
reading an operation definition for the user-interface request that references an operation; and
generating user-interface responsive to the definitions retrieved from the reading steps, wherein the user-interface data is displayed by the user-interface program upon verification of user authority.

26. The method of claim 25, wherein the operation definitions include authority levels indicative of users having authorization to initiate operations specified by the operation definitions, and further comprising the step of omitting from the user-interface data operations for which a user that submitted a request does not possess a requisite authority level.

27. The method of claim 25, further comprising the step of mapping a selected one of the classes to a database table and to a database column.

28. The method of claim 25, further comprising the step of generating selectable user-interface data responsive to definitions from the reading steps.

29. The method of claim 25, further comprising the step of generating selectable user-interface data indicative of classes that comprise the group.

30. The method of claim 29, further comprising the step of generating selectable user-interface data indicative of another group that comprises the group.

31. The method of claim 29, further comprising the step of generating selectable user-interface data indicative of object instances that comprise the class.

32. The method of claim 31, further comprising the step of generating selectable user-interface data indicative of another class that comprises the class.

33. The method of claim 31, further comprising the step of generating selectable user-interface data indicative of an operation associated with the class.

34. The method of claim 31, further comprising the steps of:
in response to a user-interface request that references an object instance of a class, reading a class definition and an associated operation definition; and
generating selectable user-interface data indicative of an operation associated with object instances in the class.

35. The method of claim 25, further comprising the steps of:
reading a parameter definition associated with an operation for a request that references the operation; and
generating user-interface data that solicits a parameter value in response to the parameter definition.

36. The method of claim 25, further comprising the steps of:
defining associations of graphical objects to groups;
defining associations of graphical objects to classes;
generating user-interface data that includes the graphical objects for references to the groups and classes.

37. A user-interface apparatus for an application program hosted by a data processing system, comprising:

means for generating a user-interface request from a user-interface program to retrieve definitions of an application program;

means for defining hierarchical classes of data elements of the application program with interface class definitions, predetermined ones of the classes referencing instances of data elements;

means for defining groups of classes with interface group definitions;

means for defining operations with operation definitions, wherein selected operations are associated with selected classes and instances;

in response to the user-interface request, means for reading a class definition and an associated operation definition for the user-interface request that references a class;

means for reading a group definition for the user-interface request that references a group;

means for reading an operation definition for the user-interface request that references an operation; and means for generating user-interface data responsive to definitions retrieved from the means for reading, wherein the user-interface data is displayed by the user-interface program upon verification of user authority.

38. The apparatus of claim 37, wherein the operation definitions Include authority levels indicative of users having authorization to initiate operations specified by the operation definitions, and further comprising means for omitting from the user-interface data operations for which a user that submitted a request does not possess a requisite authority level.

39. The apparatus of claim 37, further comprising means for mapping a selected one of the classes to a database table and to a database column.

40. The apparatus of claim 37, further comprising means for generating selectable user-interface data responsive to definitions from the reading steps.

41. The apparatus of claim 37, further comprising:

means for reading a parameter definition associated with an operation for a request that references the operation; and means for generating user-interface data that solicits a parameter value in response to the parameter definition.

42. An article of manufacture for a computer-based user-interface, the article of manufacture comprising a computer readable medium having instructions for causing a computer to perform a method comprising:

generating a user-interface request from a user-interface program to retrieve definitions of an application program;

defining hierarchical classes of data elements of the application program with interface class definitions, predetermined ones of the classes referencing instances of data elements;

defining groups of classes with interface group definitions;

defining operations with operation definitions, wherein selected operations are associated with selected classes and instances;

in response to a user-interface request, reading a class definition and an associated operation definition for the user-interface request that references a class;

reading a group definition for the user-interface request that references a group;

reading an operation definition for the user-interface request that references an operation; and generating user-interface data responsive to definitions retrieved from the reading steps, wherein the user-interface data is displayed by the user-interface program upon verification of user authority.

43. The article of claim 42, wherein the operation definitions include authority levels Indicative of users having authorization to initiate operations specified by the operation definitions, and the computer readable medium further comprises instructions for causing a computer to perform the step of omitting from the user-interface data operations for which a user that submitted a request does not possess a requisite authority level.

44. The article of claim 42, wherein the computer readable medium further comprises Instructions for causing a computer to perform the step of mapping a selected one of the classes to a database table and to a database column.

45. The article of claim 42, wherein the computer readable medium further comprises instructions for causing a computer to perform the step of generating selectable user-interface data responsive to definitions from the reading steps.

46. The article of claim 42, wherein the computer readable medium further comprises instructions for causing a computer to perform the steps of:

reading a parameter definition associated with an operation for a request that references the operation; and generating user-interface data that solicits a parameter value In response to the parameter definition.

47. A user-interface system for use with a computer application program and a client user-interface program, comprising:

a client user-interface program operative to provide a user-interface request for definitions;

a user-interface definition file having definitions of groups, classes, operations, and parameters, a group definition including one or more classes, a class definition including one or more object instances of data elements of the application program, an operation definition including an association with a class, and a parameter definition including an association with an operation;

a user-interface definition driver coupled to the user-interface definition file, and configured and arranged to, in response to the user-interface request for definitions, read definitions from the user-interface definition file and provide the definitions as output; and a user-interface driver coupled to the user-interface definition driver and configured and arranged to receive the user-interface request for definitions, query the user-interface definition driver for user-interface definitions, and generate user-interface data having a format that is compatible with the client user-interface program and content that is responsive to the user-interface definitions, wherein the user-interface data is displayed by the user-interface program upon verification of user authority.

48. The system of claim 47, wherein the operation definitions include authority levels indicative of users having authorization to initiate operations specified by the operation definitions, and the user-interface driver is arranged to omit from the user-interface data operations for which a user that submitted a request does not possess a requisite authority level.

49. The system of claim 47, wherein the user-interface definition file includes a mapping of a class to a database table and to a database column.

50. The system of claim 47, wherein the user-interface driver is configured and arranged to read a parameter definition associated with an operation for a request that references the operation and generate user-interface data that solicits a parameter value in response to the parameter definition.

* * * * *